Patented Oct. 10, 1939

2,176,024

UNITED STATES PATENT OFFICE 2,176,024

RETARDING DETERIORATION OF DAIRY PRODUCTS

Sidney Musher, New York, N. Y., assignor to Musher Foundation Incorporated, New York, N. Y., a corporation of New York No Drawing. Application April 17, 1939, Serial No. 268,341

6 Claims. (Cl. 99—136)

This invention relates to the retardation of deterioration of the fruit flavored ice creams, such as strawberry ice cream, peach ice cream, etc.

It has been found that fruit flavored ice creams, such as strawberry ice cream, peach ice cream, pineapple ice cream, etc., tend to develop objectionable tastes and flavors and cannot be readily stabilized against such deterioration due apparently to the inherent characteristics of the fruits bringing about deterioration of the ice cream. These difficulties are increased because of the amount of air beaten into the ice cream in the course of its manufacture, the length of time which some of the ingredients contained in the ice cream must be held in storage before ready for use, and copper which may be introduced during processing.

Other constituents of these fruit ice creams such as gelatin and egg yolk are also subject to the accelerated development of off flavors.

An object of this invention is the retardation of the development of off tastes and flavors in such fruit ice creams.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

According to the preferred procedure of the present invention, the ice cream soluble or ice cream miscible preservatives which are present in the finely divided defatted or deoiled seed and nut flours are added to the fruit ice creams to stabilize them against deterioration. These flours are preferably prepared by subjecting the seeds or nuts to direct hydraulic or expeller expression in the course of which a substantial amount, from 50% to 85%, of the oil originally present, is removed and separated from the deoiled residue.

For example, soya beans containing 20% of oil may be chopped into coarse granules and, at a temperature of about 150° F., fed into a cylinder in which a revolving screw is operating, subjecting the soya beans to constantly increasing pressure and with the oil released from the soya cells continuously flowing away from the residue.

The deoiled residue thus obtained is ground to a fine flour, preferably over 50 mesh, such residue containing less than 10% total oil content.

Solvent extraction may also be resorted to whereby the soya beans are, for example, extracted with hexane by immersing them in hexane, removing the hexane by filtration, centrifuging or settling, and evaporating off under reduced pressure the hexane remaining in the residue.

These stabilizers are water miscible and are added by incorporating the deoiled finely divided seed or nut flour with the ice cream whereby the water soluble or water miscible stabilizers present in the seed or nut flour will have been taken up and retained by the ice cream.

Where desired, the finely divided seed or nut residue may be thoroughly mixed with from 7 to 10 parts of its weight of water, preferably using water adjusted to a pH of between 5.0 and 6.5 and at a temperature of about 135° F., for 30 minutes and then allowed to stand for from 3 to 6 hours at 100° F., after which the supernatant water portion is removed by siphoning, decantation, centrifuging or filtration and is either added to the ice cream mix in its unconcentrated form, or the unconcentrated water soluble stabilizers are concentrated in a stainless steel vacuum pan under a 25 inch vacuum at 135° F. and superheated in the vacuum pan at 190° F. for 5 minutes during the evaporating process to obtain a concentrated stabilizing material having a total solids content of between 40% and 75%. Where the concentrated material is made up of 60% or more of total solids, the material is heated in the vacuum pan or during packing to about 190° F. and packed at that temperature. Sterilization may be applied for packing in cans.

The concentrated material may also be added to fillers such as to salt, sugar, or powdered skim milk and dried or powdered together by spray or drum drying methods.

Where the water soluble stabilizers are extracted as above indicated, they are sugar carbohydrate and organic phosphorus and nitrogen containing and are substantially oil free, starch free and fibre free.

In the case of the fruit ice creams, even though the fat of the ice cream is surrounded in globule form by a film of emulsifying material of the nature of casein which in turn is dispersed in the water or aqueous phase, and even though the seed or nut defatted residues in finely divided form are added to and dispersed in the aqueous phase of the emulsion, they nevertheless serve to stabilize the butterfat portion in globule form without seemingly coming into direct and intimate contact and admixture with the fat globules.

In accordance with this invention, therefore, the deoiled finely divided seed and nut residues, even though they are added to and remain in the aqueous phase and are not in immediate contact with the phase containing the butterfat, nevertheless protect the butterfat phase dispersed in the aqueous phase against deterioration.

These seed and nut defatted residues may be obtained from any of the group of the oil containing seeds or nuts after the oils contained therein have been substantially expressed or extracted therefrom leaving the residue in dry powdery form or in dry form so that they can be subjected to a grinding operation to produce dry powdery materials and not pasty oily materials. Among the seed and nut residues that may be utilized in accordance with this invention are the deoiled residues of soya beans, peanut germs, corn germs, sesame seed, cottonseed, watermelon seed, apple seed, etc., the oil content having been reduced to less than 20% and preferably to less than 10%.

By the term "seed" as used in this application, there are included these oil containing seeds and nuts.

In view of the rather strong flavored character of these various deoiled materials, they should be employed in minor proportions and should desirably not exceed 0.3% against the total weight of the fruit ice cream. Desirably, these materials should be mixed in about 5 times their weight of the ice cream mix until a smooth suspension of the flour in the mix is obtained and this mixture should be added to the balance of the ice cream mix before pasteurization and freezing.

Another method, although less desirable, is to sift the flour into the ice cream at the freezer and while the freezing of the ice cream is taking place. Desirably, this addition should be made at the start of the freezing and before the ice cream has materially increased in viscosity.

It is particularly desirable for as little as 0.2% to be used in order to avoid the development of any off flavors resulting from the addition of the residues in the finished ice cream.

Naturally, where a strongly flavored fruit ice cream is to be treated, a larger proportion of the added material may be utilized, such as up to 0.5%. Generally, however, 0.3% or less should be added to the ice cream.

This treatment is particularly desirable in connection with strawberry ice cream which is probably the fruit ice cream most subject to decomposition and deterioration during normal distribution or storage.

Of the various deoiled materials, soya beans are probably the most desirable for use and particularly when obtained following the expression of the soya bean oil therefrom.

When these various deoiled seeds are utilized, it is generally desirable to employ a slightly higher amount of egg yolk in order to increase the overrun because frequently these products tend to reduce overrun.

In the case of vanilla ice cream to which these deoiled materials are less applicable, even smaller amounts of these seed residues may be employed such as from 0.1% to 0.2%.

Just as the deoiled soya flour may be added at any point or with any of the ingredients used in the manufacture of the ice cream, so too it may be added to the fruits such as to the strawberries, peaches, etc., at the time that such fruit is put up and carried in cold storage until ready for manufacture into ice cream. When added to fruits, such materials may be used in amounts of less than 5% and desirably less than 2% against the weight of the fruit that is subsequently added to the ice cream mix.

This treatment will not only retard the loss of fresh flavor and the development of off flavors in the fruit ice creams, but will also retard the loss of fresh flavor, discoloration and the development of off flavors due to the deterioration of the fruit itself, which is a different type of deterioration than ordinary oil or fat decomposition.

Under these circumstances, when the finely divided deoiled soya beans are used in the fruits prior to manufacture into ice cream, they serve a twofold purpose of retarding deterioration of the fruit and of the ice cream as well.

Where the oil-free, starch-free, and fiber-free water or alcohol soluble elements of the deoiled seeds are employed, they should desirably be added to the ice cream in an amount of less than 0.1% and frequently as little as 0.05% will give desirable and noticeable stabilizing properties.

This deterioration of ice cream and particularly of strawberry ice cream is a different type of deterioration and is not related to glyceride oil or fat rancidity. Materials which would normally stabilize non-aqueous oils and fats do not necessarily stabilize against deterioration of a disperse fat phase in an aqueous medium. In any event, the decomposition of the fruit ice creams and particularly of strawberry ice cream, does not appear to be related to fat decomposition, but is a special decomposition of its own in which either the fruit reacts with the fat or with the protein to produce a rapid decomposition that is most objectionable.

These seed and nut residues should desirably be added to the ice cream mix before the ice cream mix is heated up to a temperature of between 145° F. and 175° F. Better results are obtained when this heat treatment is applied following the addition to the ice cream of the seed or nut residues than where those residues are added to the ice cream following the heat treatment.

These seed and nut residues such as soya bean residues may be added to liquid cream containing about 30% to 35% butterfat or even supercreams containing about 40% to 70% butterfat and preferably before the cream is heated to 145° F. or above. That cream may then be churned in the manufacture of butter whereby all of the water miscible soya materials are left behind in the buttermilk or serum and the butter is substantially free of any added soya material. Even though this involves the treatment of only the water portion of the oil in water emulsion in the form of cream, whereby the soya residue is dispersed in the aqueous phase only and is not dispersed in nor in intimate contact with the butterfat globules, nevertheless the butterfat globules have been substantially stabilized against decomposition.

These seed or nut residues or their water or alcohol soluble extracts may be added to the aqueous portion of cream in an amount of from 0.05% to 0.7%. Such treated cream may be set aside for storage for a period of from 4 to 6 months at −10° F., for example, and then that cream may be used in the manufacture of ice cream or for churning to produce butter. Or the concentrated water extract of deoiled soya beans containing 40% to 85% total solids may be added to cream before the cream is churned in the manufacture of butter. Other aqueous butterfat emulsions may also be treated in accordance with this invention by the addition thereto of a relatively small amount of the deoiled seed and nut residues.

It has also been found that when the seed or nut residue is added to the aqueous liquid phase and after a period of several minutes either at normal temperatures but preferably at somewhat elevated temperatures such as at 140° F. or following pasteurization, the undissolved portion be filtered therefrom, even when so removed the protective stabilizing properties will be retained in the filtered aqueous liquid material.

This application is a continuation in part of applications, Serial No. 97,461 filed August 22, 1936 and Serial No. 228,454, filed September 3, 1938.

Having described my invention, what I claim is:

1. Ice cream, containing butterfat in the discontinuous phase and water in the continuous phase, substantially stabilized against oxidative deterioration by having a small amount, less than 2%, of a finely divided deoiled seed residue in the aqueous phase thereof.

2. Strawberry ice cream, containing butterfat in the discontinuous phase and water in the continuous phase, substantially stabilized against oxidative deterioration by having a small amount, less than 2%, of a finely divided deoiled soya residue in the aqueous phase thereof.

3. A butterfat emulsion, containing butterfat in the discontinuous phase and water in the continuous phase, substantially stabilized against oxidative deterioration by having a small amount, less than 2%, of a finely divided substantially deoiled seed residue in the aqueous phase thereof.

4. A process of substantially stabilizing ice cream, containing butterfat in the discontinuous phase and water in the continuous phase, against oxidative deterioration, which comprises adding a small amount, less than 2%, of a finely divided deoiled seed residue to the aqueous phase thereof.

5. A process of substantially stabilizing a butterfat emulsion, containing butterfat in the discontinuous phase and water in the continuous phase, against oxidative deterioration, which comprises adding thereto a small amount, less than 2%, of a finely divided deoiled seed residue to the aqueous phase thereof.

6. A process of making butter resistant to oxidative deterioration which comprises adding to a butterfat emulsion, containing butterfat in the discontinuous phase and water in the continuous phase, a small amount, less than 2%, of a finely divided deoiled seed residue and then separating the butter.

SIDNEY MUSHER.